UNITED STATES PATENT OFFICE 2,082,880

SULPHOXYLATE-AMINO-ARSENO BENZENES

Alfred Fehrle, Bad Soden-in-Taunus, Karl Streitwolf, deceased, late of Frankfort-on-the-Main, by Frieda Streitwolf, administratrix, Frankfort-on-the-Main, and Paul Fritzsche, Frankfort-on-the-Main, Germany, assignors to Winthrop Chemical Company, Inc., New York, N. Y., a corporation of New York No Drawing. Application December 15, 1934, Serial No. 757,730. In Germany December 19, 1933

5 Claims. (Cl. 260—15)

The present invention relates to arsenobenzene-amino monosulphoxylates.

The production of nitrogenous arsenobenzenes which contain a mono-hydroxyalkylated nitrogen atom and a formaldehyde group or the sulphoxylate group situated at the other nitrogen atom, is known.

Now we have found that compounds of the following general formula $$Z-O_2S-H_2C-HN-R-As=As-R_1-N\begin{matrix}X\\Y\end{matrix}$$

wherein R and $R_1$ stand for nuclei of the benzene series both containing a hydroxyl group, X and Y stand for alkyl radicals containing at least one hydroxy group, and Z stands for an alkali metal, have valuable therapeutic properties. The new compounds may be prepared by transforming in known manner a bis-hydroxyalkyl-aminobenzene-arsonic acid, which may contain further substituents in the benzene nucleus, in conjunction with an amino-substituted benzene-arsonic acid, which may also contain further substituents in the benzene nucleus, into an arsenobenzene and causing the latter to react with formaldehyde-sulphoxylate. The same compounds are obtained by causing two molecular proportions of alkylene oxide to act on the corresponding amino-arsenobenzene-sulphoxylates free from hydroxyalkyl-groups. Instead of the sodium there may be used other alkali metals, for instance, potassium. As alkylene oxide there may be employed ethylene-oxide, propylene-oxide, isobutylene-oxide, glycide, thus the radicals —CH₂—CH₂OH; —CH₂—CHOH—CH₃;

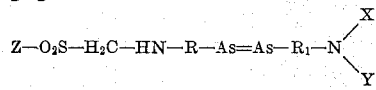

and CH₂—CHOH—CH₂OH being situated at the nitrogen of the final products. Two different hydroxyalkyl radicals may also stand at the nitrogen.

By this operation it is possible to improve fundamentally the sulphoxyl compounds, which as such cannot be applied intramuscularly, by introducing two hydroxyalkyl-groups at the same nitrogen atom, so that when injected intramuscularly, they are tolerated without causing irritation; at the same time the intravenous effect of the compound is not annulled. These compounds may consequently be applied intravenously as well as intramuscularly, which is a considerable simplification for the physician.

The following examples serve to illustrate the invention, but they are not intended to limit it thereto:

(1) 35 grams of 3-(bis-dihydroxypropyl)-amino-4-hydroxybenzene-1-arsonic acid are mixed with 22.9 grams of 3-amino-4-hydroxybenzene-1-arsonic acid and 28 grams of potassium iodide, the mixture is dissolved in 580 cc. of hydrochloric acid of 10 per cent. strength and the solution is mixed, while stirring, with 77 cc. of hypophosphorous acid of 50 per cent. strength. The temperature rises to about 35° C., while the liquid simultaneously becomes yellow. As soon as the temperature falls again, the clear solution is stirred into ethyl alcohol, the precipitated hydrochloride of 3-(bis-dihydroxypropyl)-amino-4-hydroxy-3'-amino-4'-hydroxyarsenobenzene is filtered with suction and washed with ether. The yellow preparation is readily soluble in water and methyl alcohol and contains 22.59 per cent. of arsenic. Instead of hypophosphorous acid there may also be used other reducing agents, for instance, hydrosulphite.

55 grams of the hydrochloride of 3-(bis-dihydroxypropyl)-amino-4-hydroxy-3'-amino-4'-hydroxyarsenobenzene are dissolved in 275 cc. of methyl alcohol and 275 cc. of water, and a solution of 35 grams of formaldehyde-sulphoxylate in 56 cc. of water is caused to react thereon at about 27° C.; a yellow product is precipitated which completely dissolves on addition of a sodium carbonate solution until there is a feebly alkaline reaction. If this clear yellow liquid is stirred into a mixture of ethyl alcohol and water, 3-(bis-dihydroxypropyl)-amino 4,4'-dihydroxy 3' N-(sodium sulphoxylate) amino-arsenobenzene

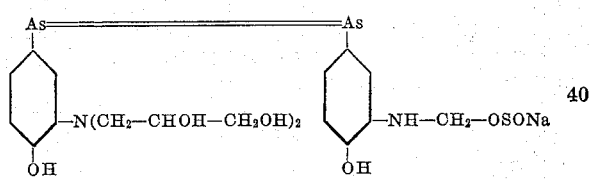

is obtained in the form of a yellow precipitate, which is filtered by suction and washed with ether.

The compound readily dissolves in water to a feebly alkaline solution and its arsenic content is 19.44 per cent. Its aqueous solution may be injected intravenously as well as intramuscularly without causing any irritation of the tissue, whereas the corresponding mono-glycide compound, the 3-dihydroxypropylamino-4-hydroxy-3'-amino-4'-hydroxy-arsenobenzene-sulphoxylate causes strong necrosis when intramuscularly injected.

The 3-(bis-dihydroxypropyl)-amino-4-hydroxybenzene-1-arsonic acid serving as parent material is obtained by heating an aqueous methyl-alcoholic solution of the sodium salt of 3-amino-4-hydroxybenzene-1-arsonic acid with an excess of glycide. The colorless acid melts at 110° C., readily dissolves in water and methyl alcohol and contains N=3.48 per cent (theoretically: N=3.68 per cent).

(2) A mixture of 12.25 grams of 3-hydroxy-4(bis-dihydroxypropyl)-aminobenzene-1-arsonic acid with 9.85 grams of 3-amino-4-hydroxybenzene-1-arsonic acid and 12 grams of potassium iodide is dissolved in 250 cc. of hydrochloric acid of 10 per cent. strength, the brown solution is decolorized with animal charcoal and mixed with 33 cc. of hypophosphorous acid of 50 per cent. strength.

The transitorily light-yellow liquid gradually becomes darker, at the same time the temperature rises to about 35° C. On addition of ethyl alcohol the yellow hydrochloride of 3-hydroxy-4-(bis-dihydroxypropyl)-amino -3'- amino-4'-hydroxyarsenobenzene is precipitated; this is filtered with suction and washed with ether. The compound is readily soluble in water and its arsenic content is 22.32 per cent.

10.0 grams of the hydrochloride are dissolved in 37 cc. of methyl alcohol and 37 cc. of water and the solution is heated to 30° C. together with a solution of 6.2 grams of formaldehyde-sulphoxylate in 10 cc. of water. No precipitation occurs. The yellow solution is made feebly alkaline by means of sodium carbonate and is precipitated in ethyl alcohol and ether. The precipitated 3,4'-dihydroxy 4-N-bis-(dihydroxypropyl) amino-3'-N-(sodium monosulphoxylate) amino-arsenobenzene

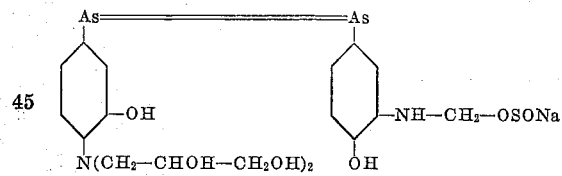

is filtered by suction and washed with ether. The yellow preparation contains 19.33 per cent. of arsenic and readily dissolves in water to a feebly alkaline solution.

The 3 - hydroxy - 4 - (bis - dihydroxypropyl) - amino-benzene-1-arsonic acid used as parent material is obtained by heating 3-hydroxy-4-aminobenzene-1-arsonic acid with at least 2 molecular proportions of glycide. The acid melts at 120° C. to 121° C.; it readily dissolves in water and contains 18.37 per cent. of arsenic and 3.56 per cent. of nitrogen.

(3) 20.92 grams of 3-bis-(hydroxyethyl)-amino-4-hydroxybenzene-1-arsonic acid are well mixed with 16.0 grams of 3-amino-4-hydroxybenzene-1-arsonic acid and 20.0 grams of potassium iodide, the mixture is dissolved in 480.0 cc. of hydrochloric acid of 10 per cent. strength, the solution is decolorized with animal charcoal and mixed with 44 cc. of hypophosphorous acid of 50 per cent. strength. During this operation the temperature rises to about 35° C. After 1 hour the yellow solution is cooled to 0° C. and stirred with 480 cc. of concentrated hydrochloric acid which has been cooled on ice; if necessary, it is filtered in order to eliminate small impurities and poured into 3.6 liters of ethyl alcohol, the hydrochloride of 3-bis-(hydroxyethyl)-amino-4-hydroxy- 3' -amino- 4' -hydroxyarsenobenzene being obtained in the form of a yellow precipitate, which is filtered with suction and washed with ether. The compound readily dissolves in water and contains 25.79 per cent. of arsenic.

26 grams of the hydrochloride are dissolved in 260 cc. of water and the solution is stirred at about 35° C. with a solution of 39 grams of formaldehyde-sodium-sulphoxylate in 78 cc. of water; the sulphoxylic acid is thus precipitated and is again dissolved on addition of sodium carbonate. From this solution there is obtained, on addition of ethyl alcohol, a yellow precipitate of 3-N-di-(hydroxy ethyl) amino-4,4'-dihydroxy-3'-N-(sodium monosulphoxylate) amino-arsenobenzene

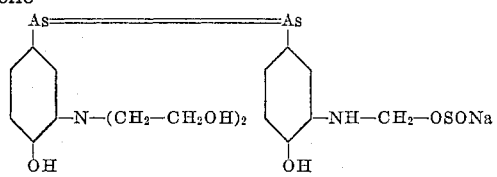

which is filtered by suction and washed with ether. The compound is readily soluble in water and contains 20.28 per cent. of arsenic.

The 3-bis-(hydroxyethyl)-amino-4-hydroxybenzene-1-arsonic acid used as parent material is obtained by causing ethylene oxide to act upon an aqueous solution of the sodium salt of 3-amino-4-hydroxybenzene-1-arsonic acid. The acid readily dissolves in water and methyl alcohol and contains 4.12 per cent. of nitrogen (calculated: 4.35 per cent. of nitrogen).

(4) 38.75 grams of 3-amino-4,4'-dihydroxyarsenobenzene-3'-amino-monosulphoxylate are dissolved in water and heated to about 65° C. with 7.4 grams of glycide. The clear yellow solution is poured into a mixture of ethyl alcohol and ether whereby the 3-N-bis-(dihydroxypropyl) amino-4,4'-dihydroxy-3'-N-(sodium monosulphoxylate) amino-arsenobenzene of the formula

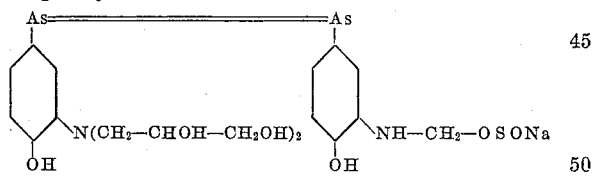

la is precipitated which is filtered by suction and washed with ether. The yellow compound is readily soluble in water to a feebly alkaline solution and contains 19.2 per cent. of arsenic. As parent material there is used 3-nitro-4-hydroxybenzene-1-arsonic acid or 3-amino-4-hydroxybenzene-1-arsonic acid which is reduced in known manner to 3,3'-diamino-4,4'-dihydroxyarsenobenzene by means of hydrosulphite and then condensed to the corresponding amino mono-sulphoxylate sodium with the aid of formaldehyde-sodium-sulphoxylate.

(5) By heating 19.38 grams of 3,3'-dihydroxy-4,4'-diamino-arsenobenzene-monosulphoxylate in an aqueous solution at about 65° C. with 2.2 grams of ethylene oxide, 3,3'-dihydroxy-4-N-di-(hydroxy ethyl) amino-4'-N-(sodium monosulphoxylate) amino-arsenobenzene of the formula

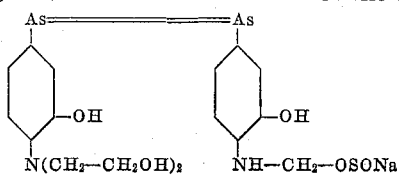

is produced. The yellow product contains 19.48 per cent. of arsenic and is readily soluble in water.

The 3-hydroxy-4-aminobenzene-1-arsonic acid necessary as parent material may be prepared in the manner indicated in Germant Patent No. 244,166. This acid is reduced in the usual manner in a hydrochloric acid solution by means of hypophosphorous acid to the hydrochloride of 3,3'-dihydroxy-4,4'-diaminoarsenobenzene. The yellow powder finally obtained is readily soluble in water and contains 18.7 per cent. of arsenic. When it is caused to react with formaldehyde-sodium-sulphoxylate the corresponding amino monosulphoxylate is obtained.

(6) 77.5 grams of 4,4-dihydroxy-3-amino-3'-N-(sodium monosulphoxylate) amino arsenobenzene are dissolved in water; 7.4 grams of glycide are introduced, while stirring, the temperature rising from 19° C. to 27° C., and, after cooling, 4.4 grams of ethylene oxide are added. From the clear yellow solution there is precipitated on addition of ethyl alcohol and ether the yellow 3-N-(dihydroxypropyl hydroxyethyl) amino-3'-N-(sodium monosulphoxylate) amino arsenobenzene of the formula

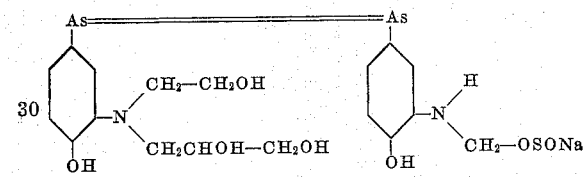

This is filtered with suction; in order to further purify it, it may be dissolved in water and precipitated again with ethyl alcohol and ether. The sulphoxylate is readily soluble in water to a feebly alkaline solution and contains about 19 per cent. of arsenic. The same compound is obtained by causing 1 molecular proportion of ethylene oxide and 1 molecular proportion of glycide to act successively on 3-amino-4-hydroxybenzene-1-arsonic acid, reducing the 3-(dihydroxy-propyloxyethyl)-amino-4-hydroxybenzene-1-arsonic acid obtained in conjunction with one molecular proportion of 3-amino-4-hydroxybenzene-1-arsonic acid and then causing the product of reduction to react in known manner with formaldehyde-sodium-sulphoxylate. The two products prepared in different ways show exactly the same chemical properties and the same pharmacological efficacy, which proves their identity.

We claim:
1. The products of the following general formula:

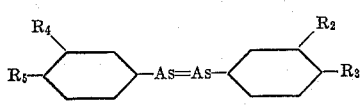

wherein $R_2$ and $R_3$ are members of the group consisting of —OH and

X and Y being alkyl radicals containing at least one hydroxyl group and $R_2$ being hydroxyl when $R_3$ is the group

and $R_3$ being hydroxyl when $R_2$ is the group

and $R_4$ and $R_5$ are members of the group consisting of —OH and —NH·CH$_2$·SO$_2$Z, Z being an alkali metal, $R_4$ being hydroxyl when $R_5$ is the group —NH·CH$_2$·SO$_2$Z, and $R_5$ being hydroxyl when $R_4$ is the group —NH·CH$_2$·SO$_2$Z, said products being readily soluble in water and showing valuable therapeutic properties.

2. The products of the following general formula:

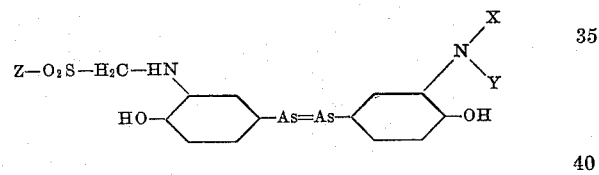

wherein X and Y stand for alkyl radicals containing at least one hydroxy group, and Z stands for an alkali metal, said products being readily soluble in water and showing valuable therapeutic properties.

3. The product of the following formula:

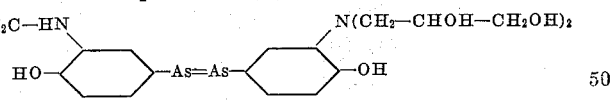

said product being readily soluble in water and showing valuable therapeutic properties.

4. The product of the following formula:

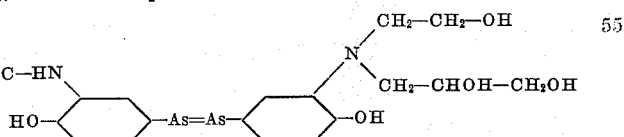

said product being readily soluble in water and showing valuable therapeutic properties.

5. The product of the following formula:

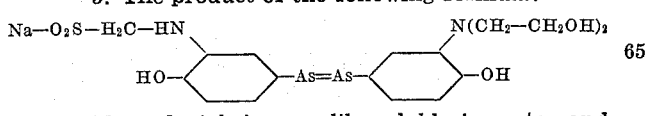

said product being readily soluble in water and showing valuable therapeutic properties.

ALFRED FEHRLE.
FRIEDA STREITWOLF,
*Administratrix of Karl Streitwolf, Deceased.*
PAUL FRITZSCHE.